US009436750B2

(12) United States Patent
Iannicelli et al.

(10) Patent No.: US 9,436,750 B2
(45) Date of Patent: Sep. 6, 2016

(54) FRAME BASED DATA REPLICATION IN A CLOUD COMPUTING ENVIRONMENT

(71) Applicant: Verizon Patent and Licensing Inc., Basking Ridge, NJ (US)

(72) Inventors: Alex Iannicelli, Andover, MA (US); Kishore Chitrapu, Shrewsbury, MA (US); Jeffrey M. Bloom, Bellingham, MA (US); Paul M. Curtis, Sudbury, MA (US)

(73) Assignee: VERIZON PATENT AND LICENSING INC., Basking Ridge, NJ (US)

( * ) Notice: Subject to any disclaimer, the term of this patent is extended or adjusted under 35 U.S.C. 154(b) by 267 days.

(21) Appl. No.: 14/072,988

(22) Filed: Nov. 6, 2013

(65) Prior Publication Data

US 2015/0127605 A1 May 7, 2015

(51) Int. Cl.
*G06F 17/30* (2006.01)

(52) U.S. Cl.
CPC ... *G06F 17/30575* (2013.01); *G06F 17/30067* (2013.01); *G06F 17/30286* (2013.01); *G06F 17/30011* (2013.01)

(58) Field of Classification Search
CPC .... G06F 3/065; G06F 21/31; G06F 11/2094; G06F 3/067; G06F 3/0619; G06F 3/06; G06F 9/4868; G06F 17/30; G06F 17/30575; G06F 11/1492; G06F 17/30212; G06F 17/30215; G06F 17/30368; G06F 17/30578; G06F 17/30581; H04L 67/108; H04L 67/1095
USPC .................... 709/25; 711/112; 707/610, 638
See application file for complete search history.

(56) References Cited

U.S. PATENT DOCUMENTS

| | | | | | |
|---|---|---|---|---|---|
| 6,061,356 | A * | 5/2000 | Terry | H04L 12/4625 | 370/401 |
| 8,743,884 | B2 * | 6/2014 | Moutarlier | H04L 69/16 | 370/236 |
| 2003/0158998 | A1 * | 8/2003 | Smith | G06F 3/0601 | 711/112 |
| 2006/0035589 | A1 * | 2/2006 | Shvodian | H04L 1/1858 | 455/18 |
| 2013/0242993 | A1 * | 9/2013 | Basso | H04L 45/16 | 370/390 |
| 2014/0075111 | A1 * | 3/2014 | Pike | G06F 3/0665 | 711/114 |
| 2014/0181014 | A1 * | 6/2014 | Balakrishnan | G06F 17/30312 | 707/611 |
| 2014/0195636 | A1 * | 7/2014 | Karve | G06F 3/0619 | 709/215 |
| 2014/0379643 | A1 * | 12/2014 | Balakrishnan | G06F 17/30581 | 707/611 |

* cited by examiner

*Primary Examiner* — Shahid Alam
*Assistant Examiner* — Alicia Antoine

(57) ABSTRACT

A device may receive information associated with a write operation to be performed on a storage volume included in a cloud computing environment, and may divide the information into a group of write frames. Each write frame may include a respective portion of the information. The device may determine information that identifies members of a replication set associated with the storage volume. The device may provide each write frame to each member. The device may receive a reply frame, associated with a write frame, from a member. The device may determine that the reply frame is a last reply frame associated with the write frame and may modify source information to form a modified reply frame. The device may provide the modified reply frame. The modified reply frame may be provided to indicate that the portion of the write operation, associated with the write frame, has been successfully performed.

20 Claims, 11 Drawing Sheets

500

FRAME BASED DATA REPLICATION IN A CLOUD COMPUTING ENVIRONMENT

BACKGROUND

Cloud computing is the use of computing resources (e.g., hardware, software, storage, computing power, etc.) which are available from a remote location and accessible over a network, such as the Internet. Cloud computing environments deliver the computing resources as a service rather than as a product, whereby shared computing resources are provided to user devices (e.g., computers, smart phones, etc.). Customers may buy these computing resources and use the computing resources on an on-demand basis. Cloud computing environments provide services that do not require end-user knowledge of a physical location and configuration of a system that delivers the services.

DETAILED DESCRIPTION

The following detailed description of example implementations refers to the accompanying drawings. The same reference numbers in different drawings may identify the same or similar elements.

A cloud computing environment may be capable of transmitting frames of user data (e.g., via a data link layer) using a network protocol (e.g., Advanced Technology Attachment over Ethernet ("AoE"), etc.), associated with a computing resource in the cloud computing environment, that allows the user data be received and stored to a storage volume in the cloud computing environment. Additionally, the cloud computing environment may be configured to maintain (e.g., in the storage volume) a replication set associated with the user data (e.g., the replication set including two or more members that each store an identical copy of the user data). Implementations described herein may allow a computing resource, associated with a cloud computing environment, to maintain a replication set by transmitting frames of user data, via a data link layer, to one or more storage resources associated with maintaining one or more members of the replication set.

Figure 1A:
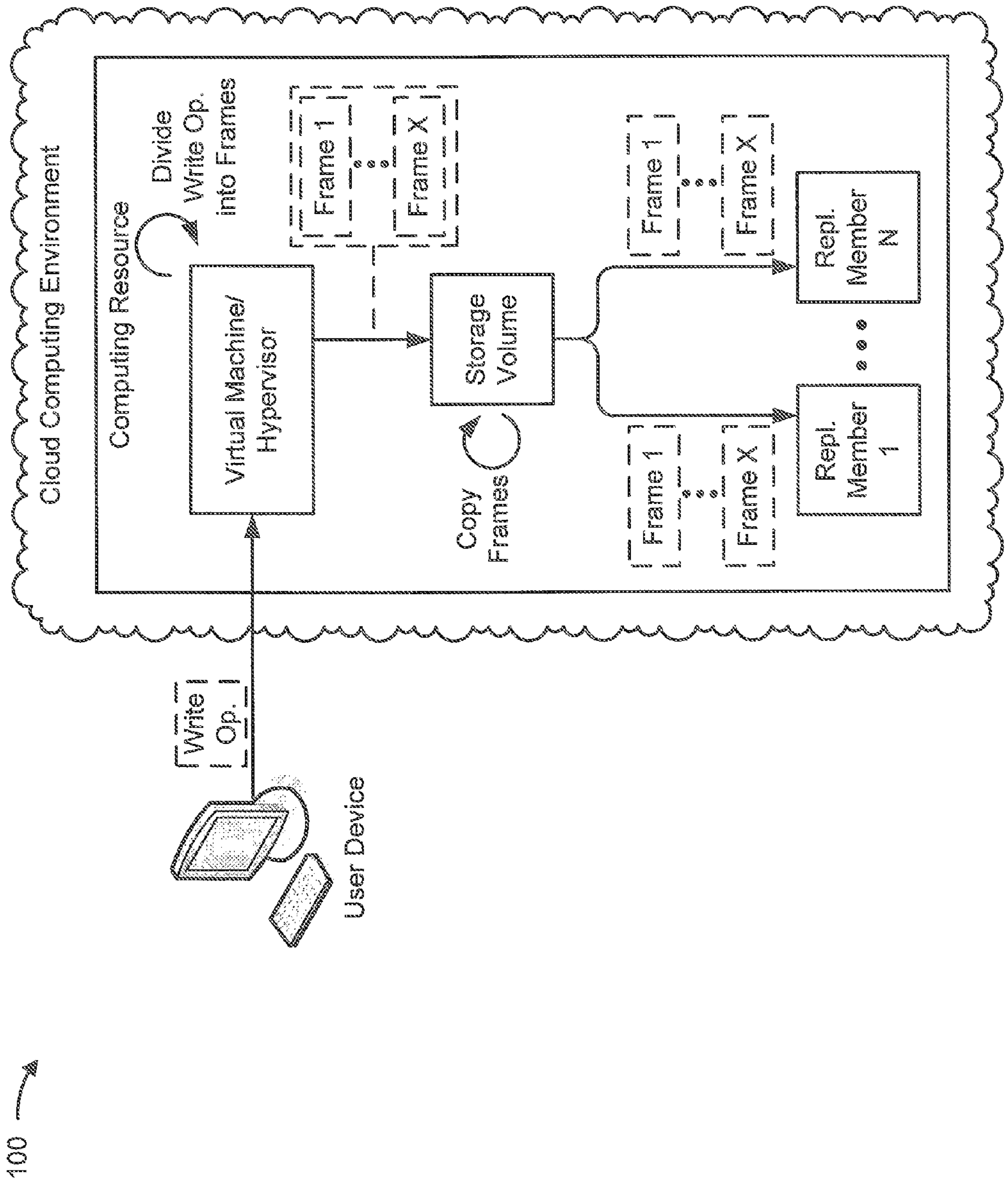
FIGS. 1A and 1B are diagrams of an overview of an example implementation described herein.
Figure 1B:
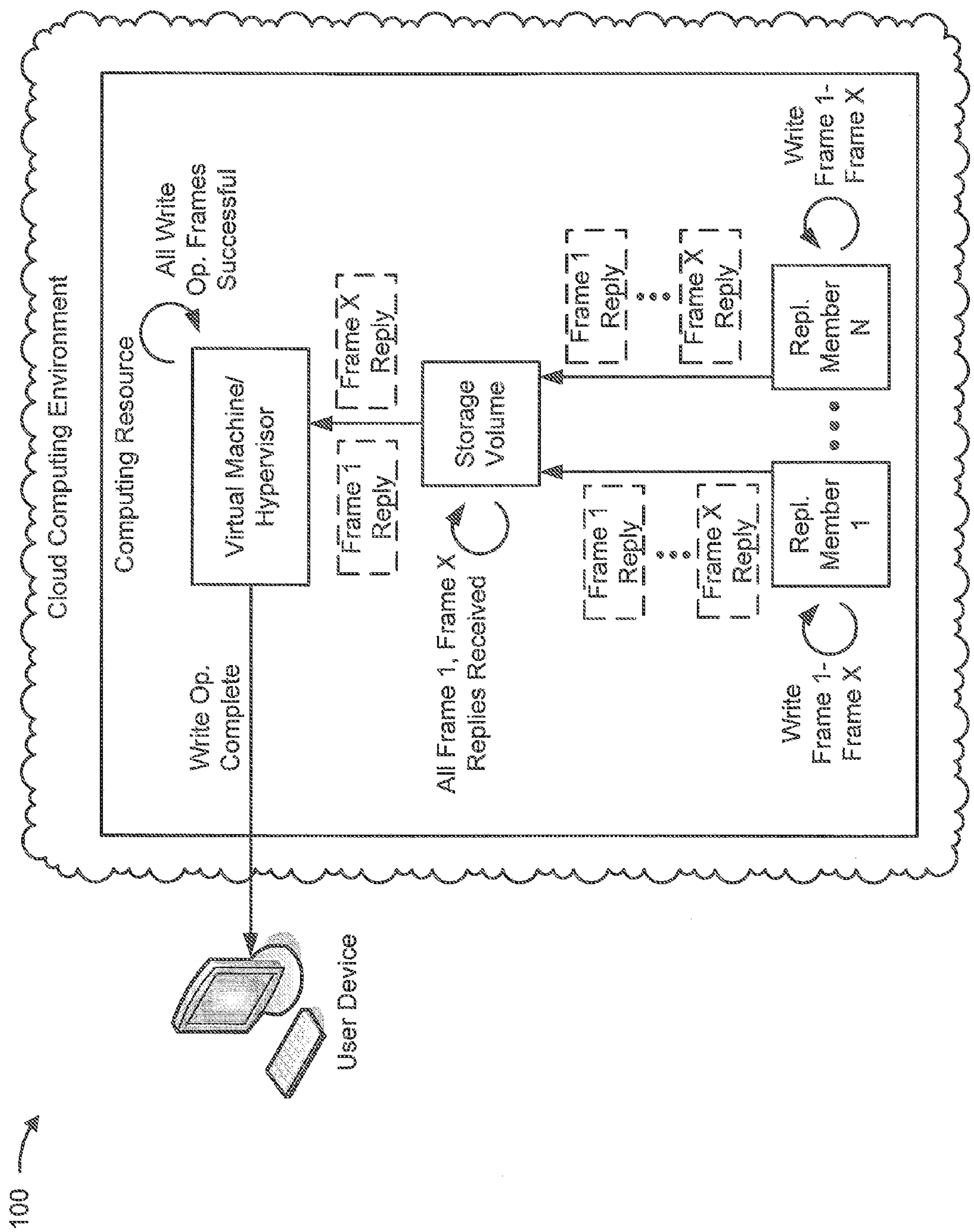

FIGS. 1A and 1B are diagrams of an overview of an example implementation 100 described herein. For the purposes of example implementation 100, assume that a user of a user device wishes to perform a write operation that causes user data, associated with the user, to be stored in a storage volume in a cloud computing environment. Further, assume that the cloud computing environment is configured (e.g., based on an agreement between a service provider of the cloud computing environment and the user) to maintain a replication set of the user data that includes N replication members (e.g., the cloud computing environment is configured to maintain N identical sets of user data) that are stored in one or more storage resources associated with the storage volume.

As shown in FIG. 1A, the user device may provide (e.g., based on user input) information, associated with the write operation, to a computing resource included in the cloud computing environment. As shown, the write operation may be received by a virtual machine (e.g., a virtual machine associated with managing traffic associated with the user) that is running on a hypervisor associated with the computing resource. As shown, the virtual machine/hypervisor may divide the write operation into a quantity of frames (e.g., frame 1 through frame X), such that each frame includes a respective portion of the information associated with the write operation.

As further shown in FIG. 1A, the virtual machine/hypervisor may provide the frames to the storage volume (e.g., the storage volume associated with the user device). As further shown, assume that the storage volume identifies a replication set that includes a quantity replication members (e.g., replication member 1 through replication member N), associated with the user device, that are to perform the write operation (e.g., each of the N replication members is configured to maintain a copy of the user data). As shown, the storage volume may provide a copy of each frame, of the quantity of frames, to each replication member included in the replication set (e.g., such that each replication member receives each frame).

As shown in FIG. 1B, each of the N replication members may receive each of the frames and may (e.g., asynchronously) perform the portion of the write operation associated with each frame. As shown, each replication member may provide (e.g., to the storage volume) a reply, associated with each frame, when the replication member finishes performing the portion of the write operation associated with the frame (e.g., replication member 1 may perform a write operation associated with frame X and may provide a reply associated with frame X, replication member N may perform a write operation associated with frame 1 and may provide a reply associated with frame 1, etc.)

As further shown in FIG. 1B, the storage volume may detect when all replies, associated with a particular frame, are received by the storage volume (e.g., the storage volume may detect that the storage volume has received a reply, associated with frame 1, from all members of the replication set). As further shown, the storage volume may provide a reply, associated with each successful frame, to the virtual machine/hypervisor (e.g., the storage volume may provide a reply associated with frame 1, the storage volume may provide a reply associated with frame X, etc.).

As further shown, the virtual machine/hypervisor may detect when the virtual machine/hypervisor has received a reply associated with each frame (e.g., each frame, associated with the write operation, created by the virtual machine/hypervisor). As further shown, the virtual machine/hypervisor may provide, to the user device, information indicating that the write operation is complete (e.g., since the virtual machine/hypervisor has received a reply associated with each frame).

In this way, one or more cloud resources (e.g., associated with a computing resource in a cloud computing environment) may maintain a replication set by transmitting frames, associated with user data, via a data link layer, to one or more storage resources associated with maintaining one or more members of the replication set.

Figure 2:
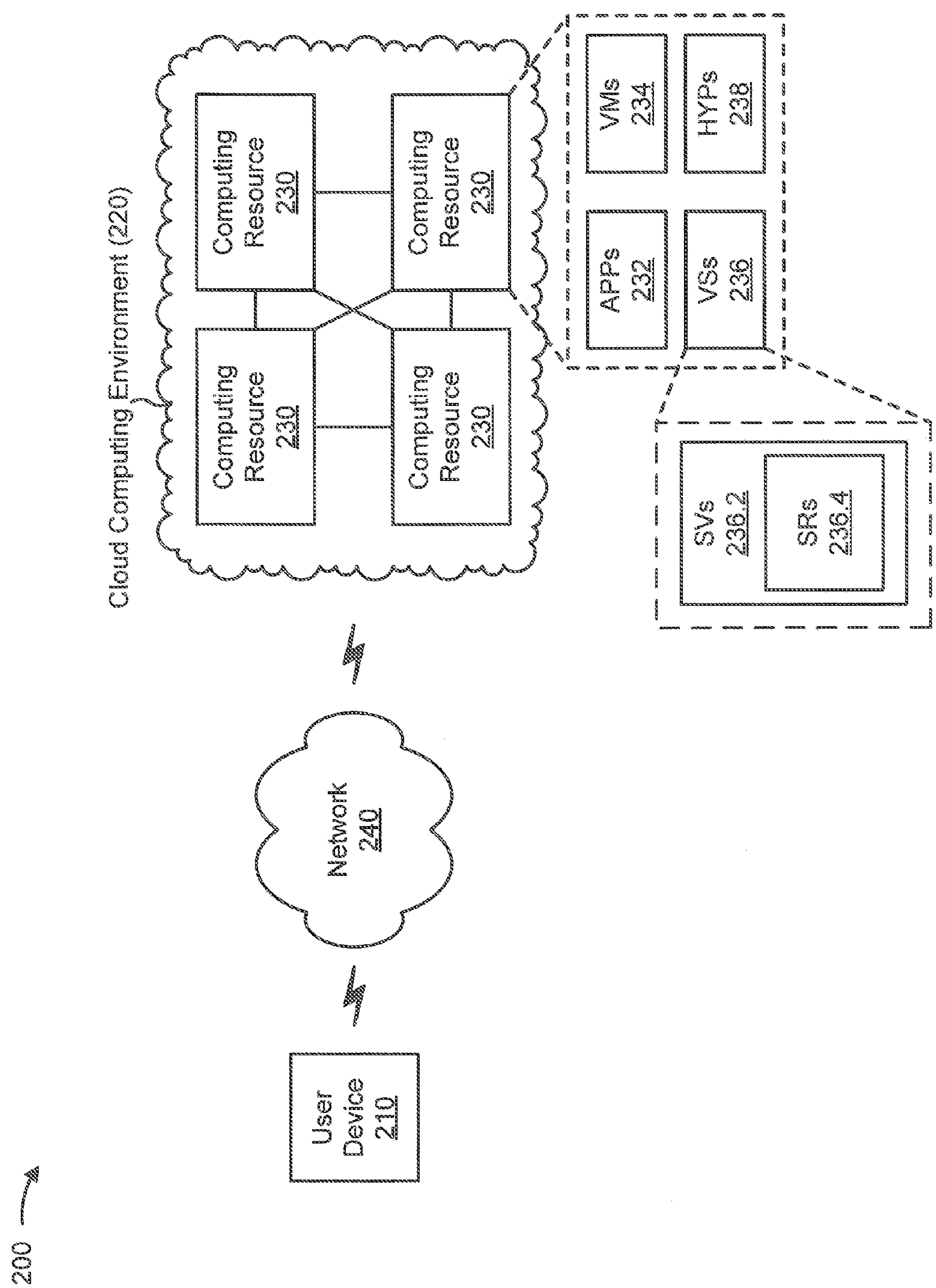
FIG. 2 is a diagram of an example environment in which systems and/or methods described herein may be implemented.

FIG. 2 is a diagram of an example environment 200 in which systems and/or methods described herein may be implemented. As shown, environment 200 may include a user device 210 interconnected with a cloud computing environment 220 via a network 240. Components of environment 200 may interconnect via wired connections, wireless connections, or a combination of wired and wireless connections.

User device 210 may include one or more devices that are capable of communicating with cloud computing environment 220 via network 240. For example, user device 210 may include a laptop computer, a personal computer, a tablet computer, a desktop computer, a workstation computer, a smart phone, a personal digital assistant ("PDA"), and/or another computation or communication device. In some implementations, user device 210 may be associated with a user that receives services from cloud computing environment 220.

Cloud computing environment 220 may include an environment that delivers computing as a service, whereby shared resources, services, etc. may be provided to user device 210. Cloud computing environment 220 may provide computation, software, data access, storage, etc. services that do not require end-user (e.g., user device 210) knowledge of a physical location and configuration of system(s) and/or device(s) that deliver the services.

As shown, cloud computing environment 220 may include a group of computing resources 230 (referred to collectively as "computing resources 230" and individually as "computing resource 230").

Computing resource 230 may include one or more personal computers, workstation computers, server devices, or another type of computation and/or communication device. In some implementations, computing resource 230 may provide services to user device 210. The cloud resources may include compute instances executing in computing resource 230, storage devices provided in computing resource 230, data transfer operations executed by computing resource 230, etc. In some implementations, computing resource 230 may communicate with other computing resources 230 via wired connections, wireless connections, or a combination of wired and wireless connections. In some implementations, one or more computing resources 230 may be assigned (e.g., by a device associated with the cloud computing service provider, etc.) to process and/store data, associated with a user, in accordance with an agreement (e.g., a service level agreement ("SLA")). In some implementations, computing resource 230 may be assigned to process and/or store data associated with a replicated set of customer data.

As further shown in FIG. 2, computing resource 230 may include a group of cloud resources, such as one or more applications ("APPs") 232, one or more virtual machines ("VMs") 234, virtualized storage ("VSs") 236, one or more hypervisors ("HYPs") 238, etc.

Application 232 may include one or more software applications that may be provided to or accessed by user device 210. Application 232 may eliminate a need to install and execute the software applications on user device 210. For example, application 232 may include word processing software, database software, monitoring software, financial software, communication software, and/or any other software capable of being provided via cloud computing environment 220. In some implementations, one application 232 may send/receive information to/from one or more other applications 232, via virtual machine 234.

Virtual machine 234 may include a software implementation of a machine (e.g., a computer) that executes programs like a physical machine. Virtual machine 234 may be either a system virtual machine or a process virtual machine, depending upon use and degree of correspondence to any real machine by virtual machine 234. A system virtual machine may provide a complete system platform that supports execution of a complete operating system ("OS"). A process virtual machine may execute a single program, and may support a single process. In some implementations, virtual machine 234 may execute on behalf of a user (e.g., user device 210), and may manage infrastructure of cloud computing environment 220, such as data management, synchronization, or long-duration data transfers.

Virtualized storage 236 may include one or more storage systems and/or one or more devices that use virtualization techniques within the storage systems or devices of computing resource 230. In some implementations, within the context of a storage system, types of virtualizations may include block virtualization and file virtualization. Block virtualization may refer to abstraction (or separation) of logical storage from physical storage so that the storage system may be accessed without regard to physical storage or heterogeneous structure. The separation may permit administrators of the storage system flexibility in how the administrators manage storage for end users. File virtualization may eliminate dependencies between data accessed at a file level and a location where files are physically stored. This may enable optimization of storage use, server consolidation, and/or performance of non-disruptive file migrations.

As further shown in FIG. 2, virtualized storage 236 may include a group of cloud resources, such as one or more storage volumes ("SVs") 236.2, one or more storage resources ("SRs") 236.4, etc. Storage volume 236.2 may include a unit of data storage, within virtualized storage 236, that may be identified by a unique identifier that allows storage volume 236.2 to be associated with a particular entity (e.g., a particular user device 210, a particular user, etc.). In some implementations, virtualized storage 236 may include one or more storage volumes 236.2. Storage resource 236.4 may include a storage device, associated with storage volume 236.2, that may be capable of storing data associated with a member of a replication set (e.g., a replication set that is stored within storage volume 236.2). Additionally, or alternatively storage resource 236.4 may be capable of generating and/or providing a reply frame associated with performing a write operation (e.g., a reply frame associated with performing a portion of a write operation included in a write frame). In some implementations, storage volume 236.2 may include one or more storage resources 236.4 (e.g., each storage resource 236.4 may store a member of a replication set).

Hypervisor 238 may provide hardware virtualization techniques that allow multiple operating systems (e.g., "guest operating systems") to execute concurrently on a host computer, such as computing resource 230. Hypervisor 238 may present a virtual operating platform to the guest operating systems, and may manage the execution of the guest operating systems. Multiple instances of a variety of operating systems may share virtualized hardware resources.

Hypervisor 238 may provide an interface to infrastructure as a service provided by cloud computing environment 220.

Network 240 may include a network, such as a local area network ("LAN"), a wide area network ("WAN"), a metropolitan area network ("MAN"), a telephone network, such as the Public Switched Telephone Network ("PSTN") or a cellular network, an intranet, the Internet, a fiber-optic based network, or a combination of networks.

Although FIG. 2 shows example components of environment 200, in some implementations, environment 200 may include fewer components, different components, differently arranged components, or additional components than those depicted in FIG. 2. Alternatively, or additionally, one or more components of environment 200 may perform one or more tasks described as being performed by one or more other components of environment 200.

Figure 3:
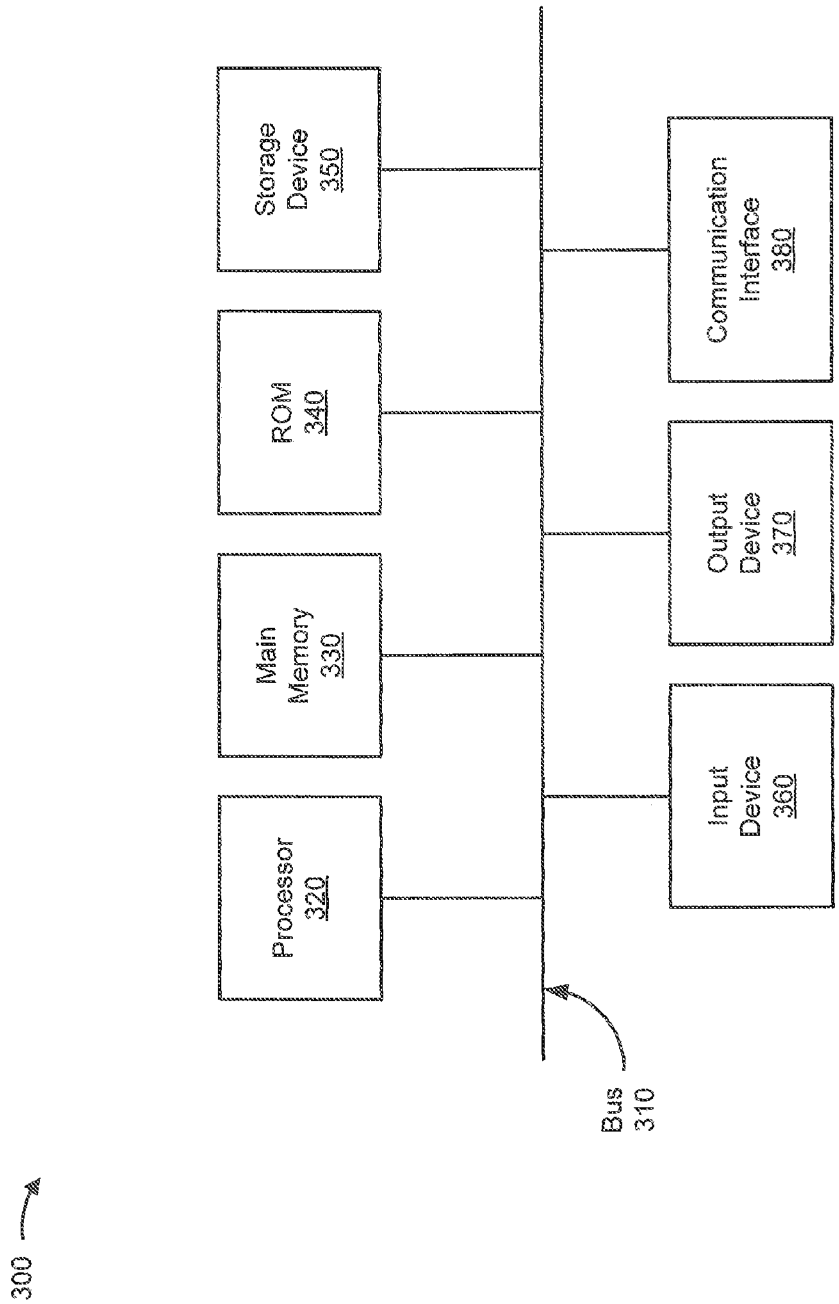
FIG. 3 is a diagram of example components of one or more devices of FIG. 2.

FIG. 3 is a diagram of example components of a device 300. Device 300 may correspond to user device 210 and/or computing resource 230. In some implementations, each of user device 210 and/or computing resource 230 may include one or more devices 300 and/or one or more components of device 300.

As shown in FIG. 3, device 300 may include a bus 310, a processor 320, a main memory 330, a read-only memory ("ROM") 340, a storage device 350, an input device 360, an output device 370, and/or a communication interface 380. Bus 310 may include a path that permits communication among the components of device 300.

Processor 320 may include one or more processors, microprocessors, application-specific integrated circuits ("ASICs"), field-programmable gate arrays ("FPGAs"), or other types of processors that interpret and execute instructions. Main memory 330 may include one or more random access memories ("RAMs") or other types of dynamic storage devices that store information and/or instructions for execution by processor 320. ROM 340 may include one or more ROM devices or other types of static storage devices that store static information and/or instructions for use by processor 320. Storage device 350 may include a magnetic and/or optical recording medium and a corresponding drive.

Input device 360 may include a component that permits a user to input information to device 300, such as a keyboard, a camera, an accelerometer, a gyroscope, a mouse, a pen, a microphone, voice recognition and/or biometric components, a remote control, a touch screen, a neural interface, etc. Output device 370 may include a component that outputs information from device 300, such as a display, a printer, a speaker, etc. Communication interface 380 may include any transceiver-like component that enables device 300 to communicate with other devices, networks, and/or systems. For example, communication interface 380 may include components for communicating with another device or system via a network.

As described herein, device 300 may perform certain operations in response to processor 320 executing software instructions contained in a computer-readable medium, such as main memory 330. A computer-readable medium may be defined as a non-transitory memory device. A memory device may include memory space within a single physical storage device or memory space spread across multiple physical storage devices.

The software instructions may be read into main memory 330 from another computer-readable medium, such as storage device 350, or from another device via communication interface 380. The software instructions contained in main memory 330 may cause processor 320 to perform processes described herein. Alternatively, hardwired circuitry may be used in place of or in combination with software instructions to implement processes described herein. Thus, implementations described herein are not limited to any specific combination of hardware circuitry and software.

Although FIG. 3 shows example components of device 300, in some implementations, device 300 may include fewer components, different components, differently arranged components, or additional components than depicted in FIG. 3. Alternatively, or additionally, one or more components of device 300 may perform one or more tasks described as being performed by one or more other components of device 300.

Figure 4:
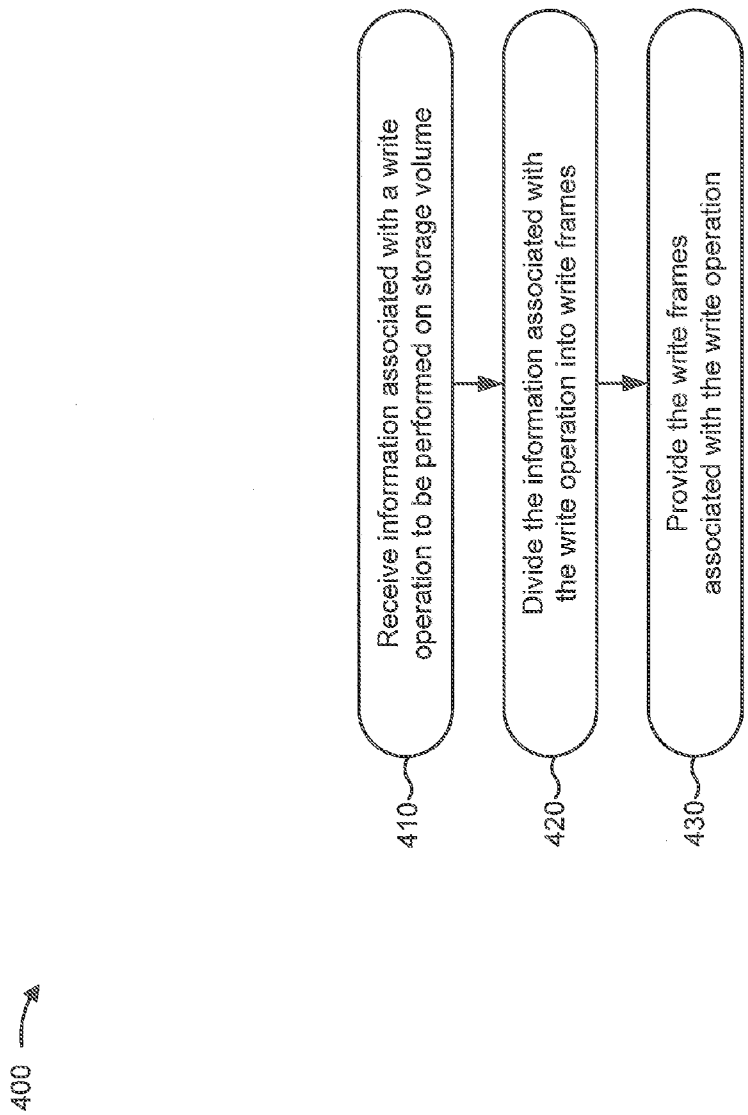
FIG. 4 is a flow chart of an example process for dividing information associated with a write operation, associated with a storage volume, into write frames, and providing the write frames.

FIG. 4 is a flow chart of an example process 400 for dividing information associated with a write operation, associated with a storage volume, into write frames, and providing the write frames. In some implementations, one or more process blocks of FIG. 4 may be performed by computing resource 230 (e.g., VM 234 running on HYP 238 ("VM 234/HYP 238")). In some implementations, one or more process blocks of FIG. 4 may be performed by another cloud resource associated with computing resource 230 (e.g., VS 236, SV 236.2, etc.) and/or another device (e.g., another computing resource 230).

As shown in FIG. 4, process 400 may include receiving information associated with a write operation to be performed on a storage volume (block 410). For example, VM 234/HYP 238 (e.g., associated with computing resource 230) may receive, from user device 210, information associated with a write operation to be performed on SV 236.2.

In some implementations, VM 234/HYP 238 may receive the information, associated with the write operation, when user device 210 provides the information associated with the write operation. Additionally, or alternatively, VM 234/HYP 238 may receive the information, associated with the write operation, when a user, associated with user device 210, causes user device 210 to send the information to VM 234/HYP 238. Additionally, or alternatively, VM 234/HYP 238 may receive the information from another cloud resource associated with computing resource 230 (e.g., another VM 234, etc.) and/or another device (e.g., another cloud resource 230, etc.).

The information associated with the write operation may include information, provided by user device 210 accessing cloud computing environment 220, that indicates that user information (e.g., user data, etc.) is to be written to a SV 236.2, associated with user device 210, maintained in cloud computing environment 220.

In some implementations, the information associated with the write operation may include information identifying user device 210 and/or a user of user device 210. For example, the information associated with the write operation may include information that identifies user device 210, such as a string of characters, a user device identifier, a network address, or the like. Additionally, or alternatively, the information associated with the write operation may include information associated with an SLA) associated with the user and/or user device 210. For example, the information associated with the write operation may include information that identifies an SLA (e.g., an SLA identifier) between the user of user device 210 and a service provider associated with cloud computing environment 220 (e.g., and VM 234/HYP 238 may identify SV 236.2, associated with the user, based on terms of the SLA associated with the SLA identifier). Additionally, or alternatively, the information associated with the write operation may include information associated with SV 236.2, associated with user device 210 and/or computing resource 230, that may be modified by the write operation. For example, the information associated with the write operation may include information (e.g., a storage volume identifier, a network address, etc.) that identifies SV 236.2, maintained by VS 236 associated with computing resource 230, that may be modified based on the write operation.

As further shown in FIG. 4, process 400 may include dividing the information associated with the write operation into write frames (block 420). For example, VM 234/HYP 238 may divide the information associated with the write operation into write frames.

In some implementations, VM 234/HYP 238 may divide the information associated with the write operation into write frames when VM 234/HYP 238 receives the information associated with the write operation from user device 210. Additionally, or alternatively, VM 234/HYP 238 may divide the information associated with the write operation into write frames when VM 234/HYP 238 receives information, indicating that VM 234/HYP 238 is to divide the information, from another cloud resource (e.g., another cloud resource within computing resource 230) and/or another device (e.g., another computing resource 230) associated with cloud computing environment 220.

A write frame may include a frame (e.g., a data link layer data packet) that is used to transmit (e.g., via cloud computing environment 220) information associated with a write operation to be performed on computing resource 230 (e.g., SV 236.2, SR 236.4, another storage disk, etc.) included in cloud computing environment 220, such as an Ethernet frame, a point-to-point protocol frame, or the like. In some implementations, VM 234/HYP 238 may divide the information associated with the write operation into the write frames such that a different portion of the information associated with the write operation is included in each write frame. For example, a first portion (e.g., a first half) of the information associated with the write operation may be included in a first write frame, and a second portion (e.g., a second half) of the information associated with the write operation may be included in a second write frame.

In some implementations, VM 234/HYP 238 may divide the information, associated with the write operation, into the write frames based on a quantity of data associated with the information. For example, VM 234/HYP 238 may divide the information into a quantity of write frames such that each write frame includes an equal quantity of data (e.g., all write frames may contain an equal amount of data). Additionally, or alternatively, VM 234/HYP 238 may divide the information associated with the write operation into write frames based on a maximum quantity of data that may be included in a write frame. For example, VM 234/HYP 238 may divide the information into a quantity of write frames such that a first set of write frames, of the quantity of write frames, includes a maximum amount of data that may be included in a write frame, and a second set of write frames, of the quantity of write frames, includes an amount of data that is less than a maximum amount of data that may be included in a write frame (e.g., four write frames may include the maximum amount of data, one write frame may include a lesser amount of data).

As further shown in FIG. 4, process 400 may providing the write frames associated with the write operation (block 430). For example, VM 234/HYP 238 may provide the write frames associated with the write operation.

In some implementations, VM 234/HYP 238 may provide the write frames, associated with the write operation, when VM 234/HYP 238 divides the information associated with the write operation into the write frames. Additionally, or alternatively, VM 234/HYP 238 may provide the write frames when VM 234/HYP 238 receives information, indicating that VM 234/HYP 238 is to provide the write frames, from another cloud resource (e.g., another cloud resource within computing resource 230) and/or another device (e.g., another computing resource 230) associated with cloud computing environment 220.

In some implementations, VM 234/HYP 238 may provide the write frames to VS 236 and/or SV 236.2 (e.g., included in VS 236) associated with the write operation (e.g., when VS 236 and/or SV 236.2 maintains the user data that is to be modified by the write operation). In some implementations, VM 234/HYP 238 may provide the write frames to VS 236 and/or SV 236.2 based on information included in the information associated with the write operation. For example, the information associated with the write operation may include information (e.g., a storage volume identifier, an SLA identifier, a user device identifier, etc.) that identifies VS 236 and/or SV 236.2 that stores the user data, and VM 234/HYP 238 may provide the write frames based on the information that identifies VS 236 and/or SV 236.2. Additionally, or alternatively, VM 234/HYP 238 may provide the write frames to VS 236 and/or SV 236.2 based on information stored by computing resource 230 (e.g., when computing resource 230 stores information that identifies VS 236 and/or SV 236.2 associated with user device 210, etc.).

Although FIG. 4 shows example blocks of process 400, in some implementations, process 400 may include additional blocks, different blocks, fewer blocks, or differently arranged blocks than those depicted in FIG. 4. Additionally, or alternatively, one or more of the blocks of process 400 may be performed in parallel.

Figure 5:
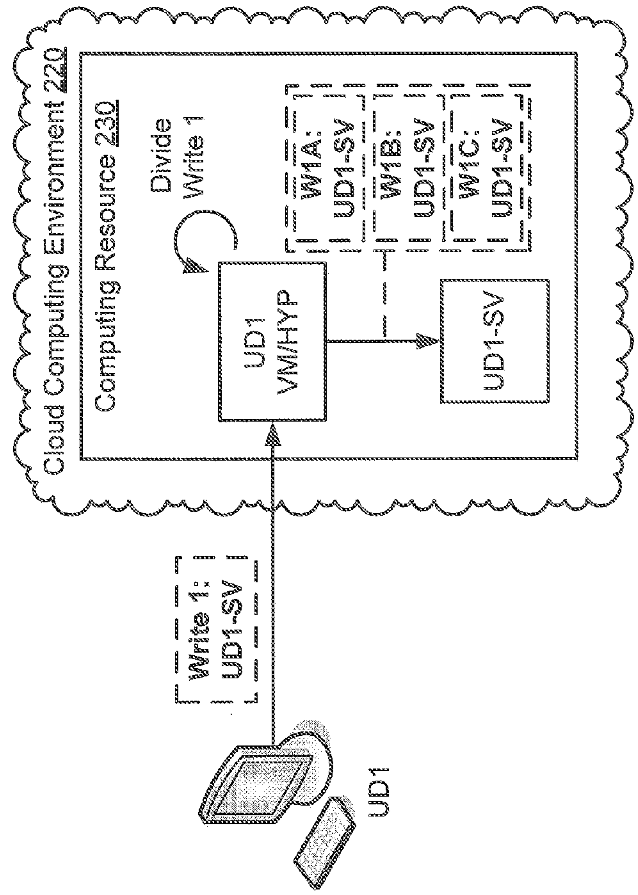
FIG. 5 is a diagram of an example implementation relating to the example process shown in FIG. 4.

FIG. 5 is a diagram of an example implementation 500 relating to example process 400 shown in FIG. 4. For the purpose of example implementation 500, assume that cloud computing environment 220 stores user data, associated with a user of a user device (e.g., UD1), based on an SLA between the user and a service provider of cloud computing environment 220. Further, assume that UD1 stores information that identifies a storage volume included in cloud computing environment 220, UD1-SV, that is assigned to maintain the user data.

As shown in FIG. 5, UD1 may provide (e.g., based on input from the user) information associated with a write operation (e.g., "Write 1"). As shown, the information associated with the write operation may include information that identifies the storage volume that is assigned to maintain the user data (e.g., UD1-SV). As further shown, a virtual machine (e.g., running on a hypervisor) that is configured to process data associated with UD1 (e.g., "UD1 VM/HYP") may receive the information associated with the write operation.

As further shown, UD1 VM/HYP may divide the information associated with the UD1-SV Write 1 write operation into three write frames (e.g., W1A: UD1-SV, W1B: UD1-SV, and W1C: UD1-SV). As shown, UD1 VM/HYP may determine (e.g., based on the storage volume identifier included in the information associated with the write operation) that UD1 VM/HYP is to provide the write frames to the storage volume associated with maintaining the user data (e.g., UD1-SV), and UD1 VM/HYP may provide each of the three write frames to UD1-SV.

As indicated above, FIG. 5 is provided merely as an example. Other examples are possible and may differ from what was described with regard to FIG. 5.

Figure 6:
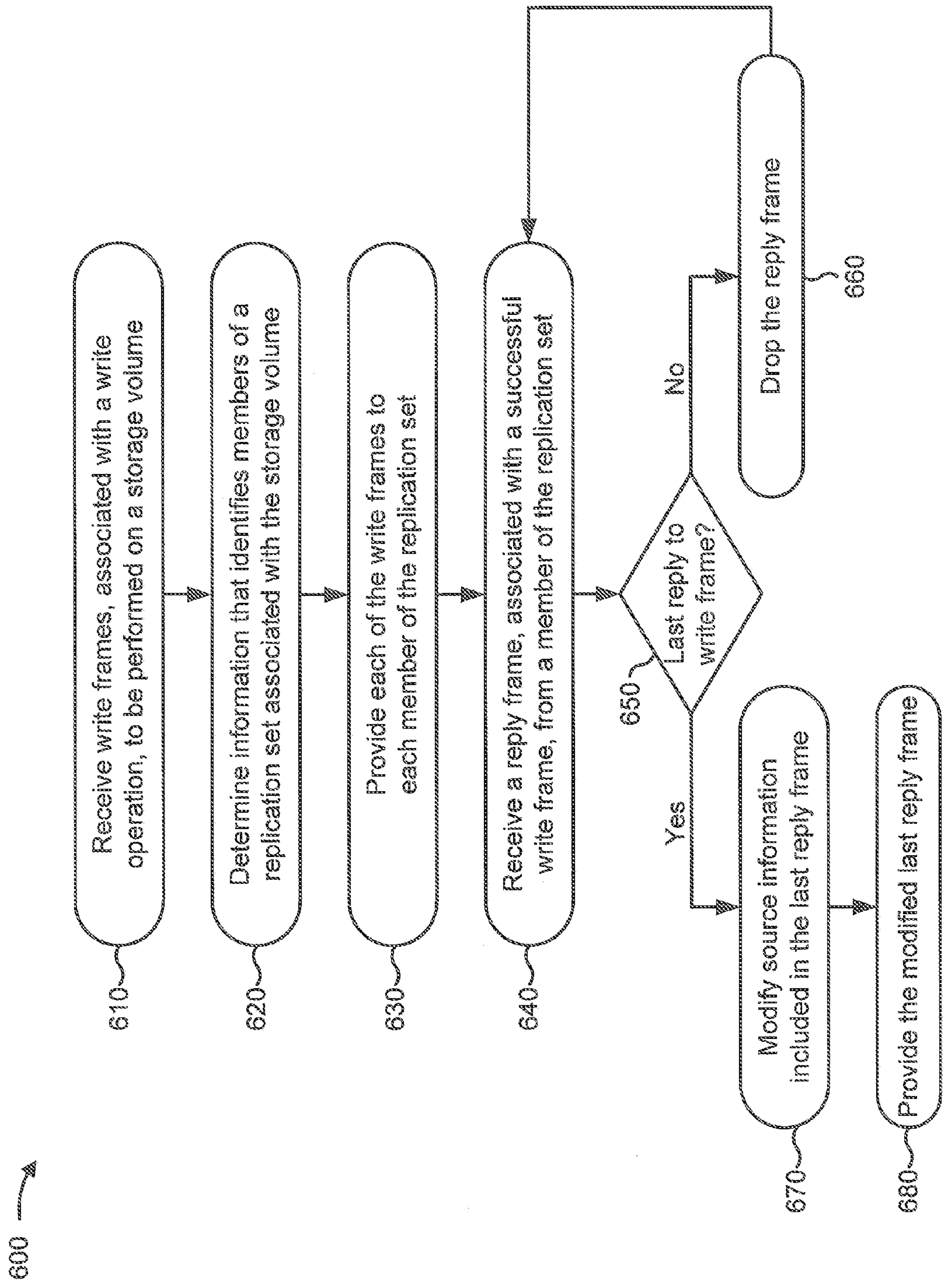
FIG. 6 is a flow chart of an example process for providing write frames, associated with a write operation, to members of a replication set, and providing a modified reply frame associated with each write frame.

FIG. 6 is a flow chart of an example process 600 for providing write frames, associated with a write operation, to members of a replication set, and providing a modified reply frame associated with each write frame. In some implementations, one or more process blocks of FIG. 6 may be performed by computing resource 230 (e.g., SV 236.2). In some implementations, one or more process blocks of FIG. 7 may be performed by another cloud resource associated with computing resource 230 (e.g., VM 234, VS 236, HYP 238, etc.) and/or another computing resource 230.

As shown in FIG. 6, process 600 may include receiving write frames, associated with a write operation, to be performed on a storage volume (block 610). For example, SV 236.2 (e.g., included in VS 236) may receive, from VM 234/HYP 238, write frames associated with a write operation, to be performed on SV 236.2.

In some implementations, SV 236.2 may receive the write frames when VM 234/HYP 238 provides the write frames (e.g., after VM 234/HYP 238 divides information, associated with the write operation, into the write frames). Additionally, or alternatively, SV 236.2 may receive the write frames when another cloud resource associated computing resource 230 (e.g., another SV 236.2, etc.) and/or another device (e.g., another cloud resource 230, etc.) provides the write frames.

As further shown in FIG. 6, process 600 may include determining information that identifies members of a replication set associated with the storage volume (block 620). For example, SV 236.2 may determine information that identifies members of a replication set associated with SV 236.2.

In some implementations, SV 236.2 may determine the information that identifies the members when SV 236.2 receives the write frames from VM 234/HYP 238. Additionally, or alternatively, SV 236.2 may determine the information that identifies the members when SV 236.2 receives information, indicating that SV 236.2 is to determine the information that identifies the members, from another cloud resource (e.g., another cloud resource within computing resource 230) and/or another device (e.g., another computing resource 230) associated with cloud computing environment 220.

Information that identifies the members of a replication set may include information that identifies two or more storage locations, associated with SRs 236.4, that are configured to store a copy of user data (e.g., data associated with user device 210, data associated with a user of user device 210, etc.). For example the information that identifies the members may include two or more strings of characters (e.g., two or more replication member identifiers, two or more network addresses, etc.), and each of the two or more strings of characters may identify a different storage location (e.g., different storage locations associated with different SRs 236.4) that are to store a copy of the user data. In some implementations, the information that identifies the members of the replication set may include information that identifies two or more SRs 236.4 that are associated with two or more computing resources 230 (e.g., members of the replication set may be maintained by different computing resources 230).

In some implementations, SV 236.2 may determine the information that identifies the members of the replication set based on information included in the write frames. For example, the write frames may include information associated with user device 210 (e.g., information that identifies user device 210 and/or a user of user device 210) and SV 236.2 may determine (e.g., based on information stored by SV 236.2 and/or another cloud resource, etc.) the information that identifies members of a replication set that are configured to store information associated with user device 210. Additionally, or alternatively, SV 236.2 may determine the information that identifies the members of the replication set based on information associated with an SLA (e.g., when SV 236.2 stores information associated with an SLA that identifies SRs 236.4 associated with storing data received by SV 236.2). Additionally, or alternatively, SV 236.2 may determine the information that identifies the members of the replication set based on information received by SV 236.2 (e.g., when VM 234/HYP 238 provides information that identifies the members of the replication set).

As further shown in FIG. 6, process 600 may include providing each of the write frames to each member of the replication set (block 630). For example, SV 236.2 may provide each of the write frames to each SR 236.4 identified as a member of the replication set.

In some implementations, SV 236.2 may provide each of the write frames when SV 236.2 determines the information that identifies the members of the replication set (e.g., after SV 236.2 has identified each member of the replication set). Additionally, or alternatively, SV 236.2 may provide each of the write frames when SV 236.2 receives information, indicating that SV 236.2 is to provide each of the write frames, from another cloud resource (e.g., another cloud resource within computing resource 230) and/or another device (e.g., another computing resource 230) associated with cloud computing environment 220.

In some implementations, SV 236.2 may provide each of the write frames based on the information that identifies each of the members of the replication set. For example, SV 236.2 may create a first copy a write frame, may modify the first copy of the write frame to include information (e.g., a member identifier, a network address, etc.) that identifies a first SR 236.4 (e.g., that stores a first copy of the user data), and may provide (e.g., to the first SR 236.4) the modified first copy of the write frame based on the information that identifies the first SR 236.4. In this example, SV 236.2 may then create a second copy of the write frame, may modify the second copy of the write frame to include information that identifies a second SR 236.4 (e.g., that stores a second copy of the user data), and may provide (e.g., to the second SR 236.4) the modified second copy of the write frame based on the information that identifies the second SR 236.4. In this manner, SV 236.2 may provide a copy of each write frame to each SR 236.4 associated with storing the user data.

In some implementations, SV 236.2 may store information that indicates a reply count, associated with each write frame, when SV 236.2 provides each write frame. For example, SV 236.2 may provide a write frame to each SR 236.4 (e.g., each of three members of the replication set) and may store information that indicates the reply count equal to the quantity of the write frames provided (e.g., SV 236.2 may store information that indicates the reply count, associated with the write frame, is three, since SV 236.2 provided the write frame to each of the three members of the replication set). In some implementations, SV 236.2 may store information that indicates the reply count for each write frame. For example, when SV 236.2 provides a quantity (e.g., five) write frames to each replication member (e.g., each of three replication members), SV 236.2 may store information that indicates the reply count for each of the quantity of write frames (e.g., the reply count, associated with each of the five write frames may be equal to three). In some implementations, the reply count may be used, by SV 236.2, to determine whether each replication member has performed the portion of the write operation associated with each frame, as discussed below.

In some implementations, SR 236.4 may perform a portion of the write operation (e.g., the portion of the write operation associated with the write frame) when SR 236.4 receives the write frame from SV 236.2 (e.g., such that a particular SR 236.4 may perform the entire write operation after the particular SR 236.4 receives each write frame from SV 236.2).

As further shown in FIG. 6, process 600 may include receiving a reply frame, associated with a successful write frame, from a member of the replication set (block 640). For example, SV 236.2 may receive a reply frame, associated a successful write frame, from SR 236.4.

In some implementations, SV 236.2 may receive the reply frame after SV 236.2 provides the write frame to SR 236.4 (e.g., after SR 236.4 receives the write frame and performs the portion of the write operation associated with the write frame). In some implementations, SV 236.2 may receive the reply frame from another cloud resource (e.g., associated with computing resource 230) and/or another device included in cloud computing environment 220 (e.g., another computing resource 230).

A reply frame may include a frame (e.g., a data link layer data packet) provided by SR 236.4 (e.g., via cloud computing environment 220), that indicates that SR 236.4 has successfully performed a portion of a write operation included in a write frame. In some implementations, the reply frame may include information that identifies SR 236.4 (e.g., the member of the replication set that has successfully performed the portion of the write operation). Additionally, or alternatively, the reply frame may include information that identifies the write frame (e.g., information that identifies a particular write frame of two or more write frames associated with a write operation).

As further shown in FIG. 6, process 600 may include determining whether the reply frame, received from the member of the replication set, is a last reply frame associated with the write frame (block 650). For example, SV 236.2 may determine whether the reply frame, received from SR 236.4, is a last reply frame associated with the write frame.

In some implementations, SV 236.2 may determine whether the reply frame is the last reply frame when SV 236.2 receives the reply frame from SR 236.4. Additionally, or alternatively, SV 236.2 may determine whether the reply frame is the last reply frame when SV 236.2 receives information, indicating that SV 236.2 is to determine whether the reply frame is the last reply frame, from another cloud resource (e.g., another cloud resource within computing resource 230) and/or another device (e.g., another computing resource 230) associated with cloud computing environment 220.

In some implementations, SV 236.2 may determine whether the reply frame is the last reply frame based on information that indicates a reply count associated with the reply frame. For example, SV 236.2 may store information that indicates the reply count associated with a write frame, SV 236.2 may receive the reply frame (e.g., associated with the write frame), and SV 236.2 may decrement the reply count (e.g., reduce the reply count by one). In this example, when the decremented reply count is equal to zero, SV 236.2 may determine that the reply frame is the last reply frame. Similarly, when the reply count is greater than zero, SV 236.2 may determine that the reply frame is not the last reply frame (e.g., SV 236.2 may determine that SV 236.2 has yet to receive at least one reply frame from at least one SR 236.4 that is to perform the portion of the write operation associated with the write frame).

As further shown in FIG. 6, if the reply frame is not the last reply frame associated with the write frame (block 650-NO), then process 600 may include dropping the reply frame (block 660). For example, SV 236.2 may determine (e.g., based on a decremented reply count, associated with the write frame, being greater than zero) that the reply frame, received from SR 236.4, is not the last reply frame associated with a write frame, and SV 236.2 may drop the reply frame.

In some implementations, SV 236.2 may drop the reply frame when SV 236.2 determines that the reply frame is not the last reply frame associated with the write frame. Additionally, or alternatively, SV 236.2 may drop the reply frame when SV 236.2 receives information, indicating that SV 236.2 is to drop the reply frame, from another cloud resource (e.g., another cloud resource within computing resource 230) and/or another device (e.g., another computing resource 230) associated with cloud computing environment 220.

In some implementations, SV 236.2 may drop the reply frame by ignoring the reply frame, by deleting the reply frame, by not forwarding the reply frame to another cloud resource and/or another device, or the like. In some implementations, SV 236.2 may drop the reply frame and may wait to receive another reply frame associated with the write frame (e.g., SV 236.2 may return to block 640).

As further shown in FIG. 6, if the reply frame is the last reply frame associated with the write frame (block 650-YES), then process 600 may include modifying source information included in the last reply frame (block 670). For example, SV 236.2 may determine (e.g., based on a decremented reply count, associated with the write frame, being equal to zero) that the reply frame, received from SR 236.4, is the last reply frame associated with a write frame, and SV 236.2 may modify source information included in the last reply frame.

In some implementations SV 236.2 may modify the source information when SV 236.2 determines that the reply frame is the last reply frame associated with the write frame. Additionally, or alternatively, SV 236.2 may modify the source information when SV 236.2 receives information, indicating that SV 236.2 is to modify the source information, from another cloud resource (e.g., another cloud resource within computing resource 230) and/or another device (e.g., another computing resource 230) associated with cloud computing environment 220.

Source information may include information (e.g., a storage resource identifier, a network address, etc.), included in a reply frame, that identifies a source of the reply frame. For example, SR 236.4 may provide the last reply frame, associated with a write frame, to SV 236.2, and the last reply frame may include information that identifies SR 236.4 that provided the last reply frame.

In some implementations, SV 236.2 may modify the source information based on information that identifies a destination associated with the information that identifies the write operation. For example, SV 236.2 may modify the source information to match information, included in the information associated with the write operation, that identifies a destination associated with the write operation (e.g., such that the source information, included in the modified reply frame, matches the destination information included in the information associated with the write operation). Additionally, or alternatively, SV 236.2 may modify the source information based on information that identifies SV 236.2 (e.g., when the information that identifies the write operation includes information that identifies SV 236.2). Additionally, or alternatively, SV 236.2 may modify the source information based on information provided by VM 234/HYP 238 (e.g., when VM 234/HYP 238 indicates that the write operation is to be performed on a particular cloud resource, SV 236.2 may modify the source information to match information that identifies the particular cloud resource). In this way, SV 236.2 may modify the last reply frame in a manner expected by VM 234/HYP 238 (e.g., such that VM 234/HYP 238 may receive information that indicates that the write operation was performed on a cloud resource identified by VM 234/HYP 238 in the write frames).

As further shown in FIG. 6, process 600 may include providing the modified last reply frame (block 680). For example, SV 236.2 may provide the modified last reply frame.

In some implementations, SV 236.2 may provide the modified last reply frame when SV 236.2 modifies the last reply frame. Additionally, or alternatively, SV 236.2 may provide the modified last reply frame when SV 236.2 receives information, indicating that SV 236.2 is to provide the modified last reply frame, from another cloud resource (e.g., another cloud resource within computing resource 230) and/or another device (e.g., another computing resource 230) associated with cloud computing environment 220.

In some implementations, SV 236.2 may provide the modified last reply frame to VM 234/HYP 238. Additionally, or alternatively, SV 236.2 may provide the modified last reply frame to another cloud resource (e.g., another cloud resource within computing resource 230) and/or another device (e.g., another computing resource 230) associated with cloud computing environment 220.

In some implementations, SV 236.2 may provide a last reply frame, associated with each write frame, to VM 234/HYP 238, and VM 234/HYP 238 may determine that the write operation is complete. For example, SV 236.2 may provide a last reply frame, associated with each write frame (e.g., each write frame created by VM 234/HYP 238), and VM 234/HYP 238 may determine that the write operation is complete based on receiving a group of last reply frames (e.g., each reply frame being associated with a different write frame). In some implementations, VM 234/HYP 238 may provide information, indicating that the write operation is complete, to user device 210 based on VM 234/HYP 238 receiving the last reply frame from SV 236.2.

Although FIG. 6 shows example blocks of process 600, in some implementations, process 600 may include additional blocks, different blocks, fewer blocks, or differently arranged blocks than those depicted in FIG. 6. Additionally, or alternatively, one or more of the blocks of process 600 may be performed in parallel.

FIGS. 7A-7D are diagrams of an example implementation 700 relating to example process 600 shown in FIG. 6. For the purpose of example implementation 700, assume a virtual machine running on a hypervisor (e.g., UD1 VM/HYP), has received information, associated with a write operation, from a user device (e.g., UD1). Further, assume that the information associated with the write operation indicates that the write operation is to be performed on storage volume associated with UD1, identified as UD1-SV. Finally, assume that UD1 VM/HYP has divided the information associated with the write operation into three write frames (e.g., each write frame including a different portion of the information associated with the write operation), and that UD1 VM/HYP has provided the three write frames (e.g., W1A: UD1-SV, W1B: UD1-SV, and W1C: UD1-SV) to UD1-SV.

Figure 7A:
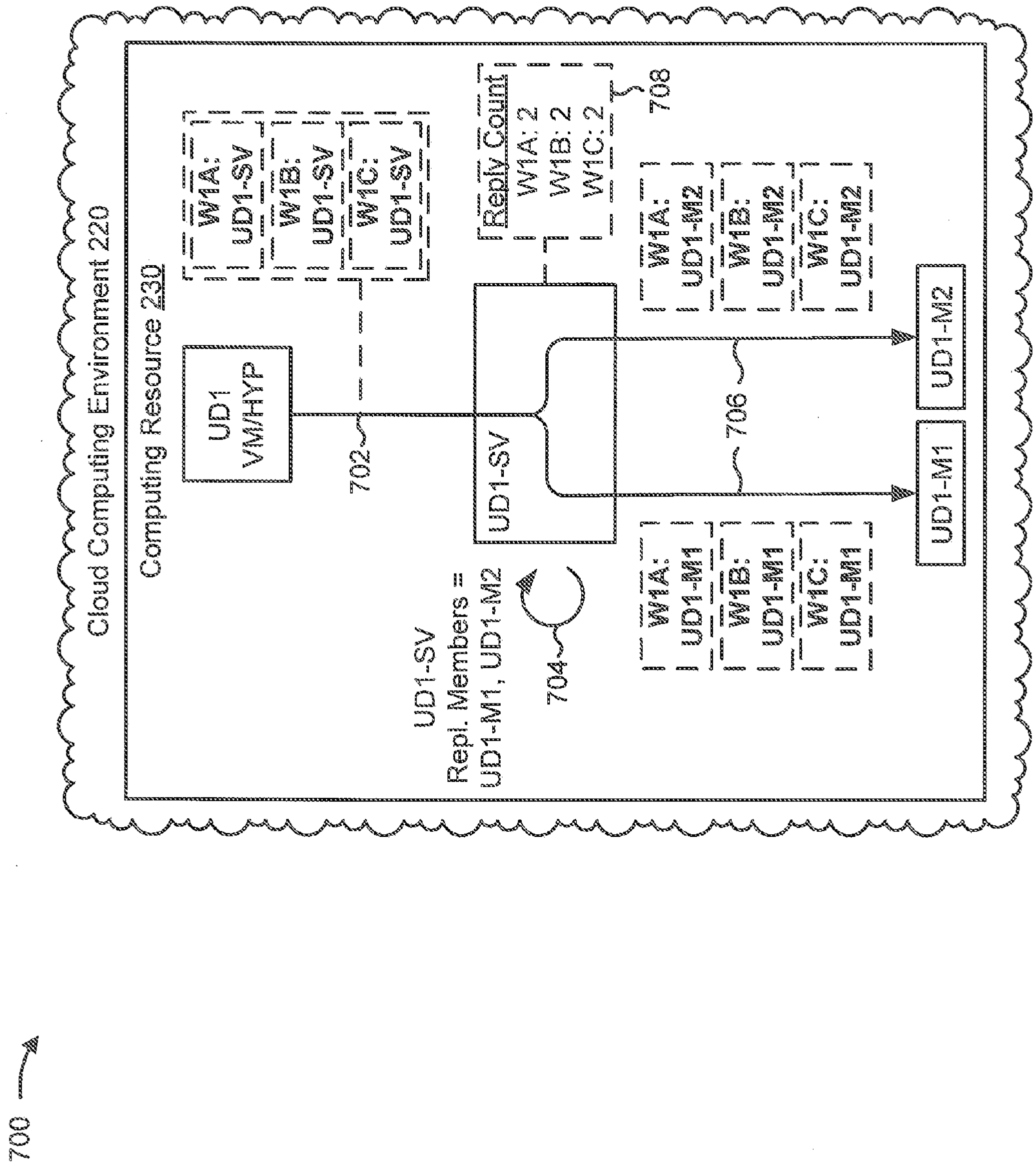
FIGS. 7A-7D are diagrams of an example implementation relating to the example process shown in FIG. 6.

As shown in FIG. 7A, and by reference number 702, UD1-SV may receive the three write frames from UD1 VM/HYP. As shown by reference number 704, UD1-SV may determine (e.g., based on information stored by UD1-SV) information that identifies two members of a replication set (e.g., UD1-M1 and UD1-M2), associated with UD1-SV, that are each to maintain a copy of data associated with UD1.

As shown by reference number 706, UD1-SV may provide (e.g., based on information that identifies UD1-M1 and UD1-M2) a copy of each of the three write frames to each of the two members of the replication set (e.g., UD1-SV may provide a copy of the W1A write frame to both UD1-M1 and UD1-M2, UD1-SV may provide a copy of the W1B write frame to both UD1-M1 and UD1-M2, and UD1-SV may provide a copy of the W1C write frame to both UD1-M1 and UD1-M2). As shown by reference number 708, UD1-SV may store information that indicates a reply count associated with each of the three frames (e.g., the reply count for each of the write frames is set to two, since UD1-SV provided two copies of each of the write frames).

Figure 7B:
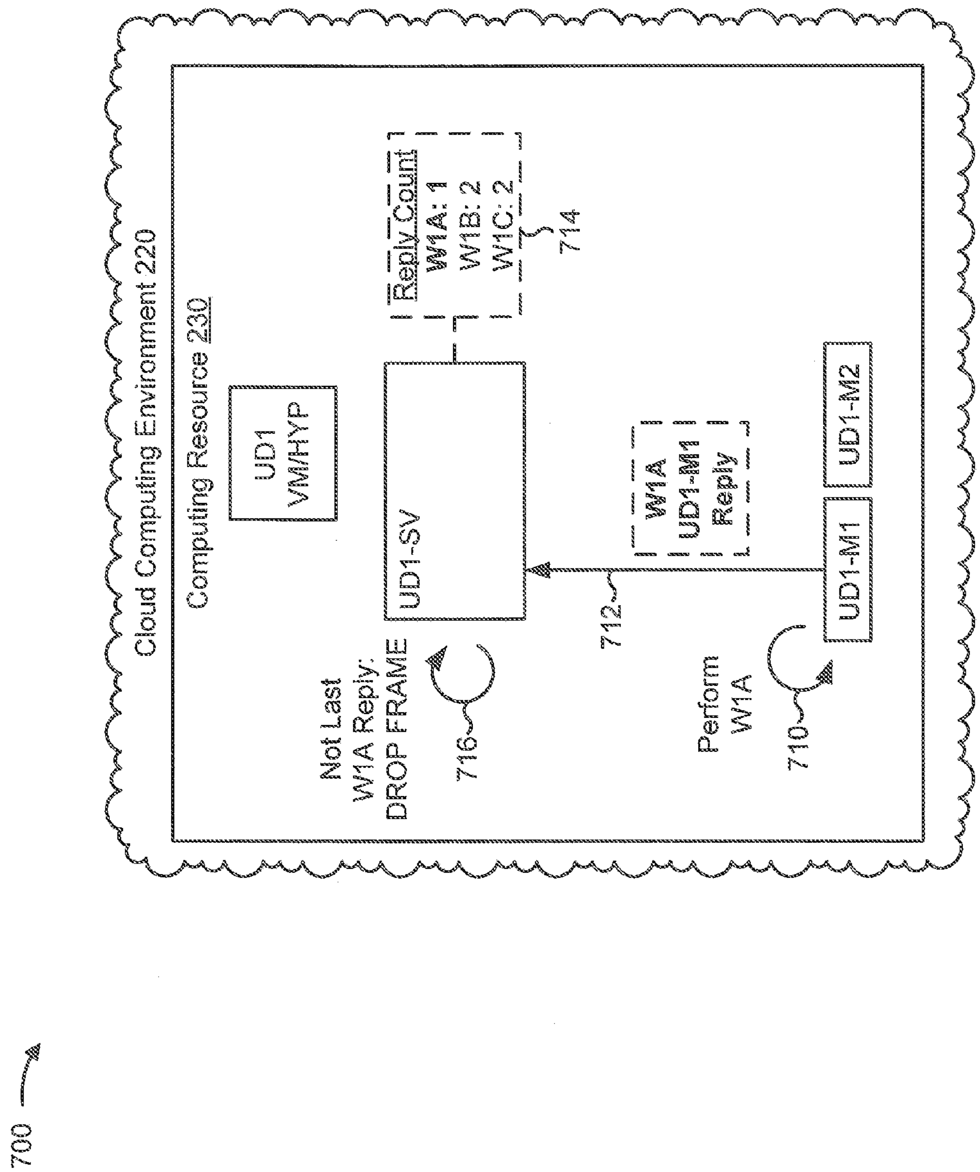

As shown in FIG. 7B, and by reference number 710, UD1-M1 may perform the portion of the write operation included in the W1A write frame (e.g., after receiving the W1A write frame from UD1-SV). As shown by reference number 712, UD1-M1 may provide a reply frame, associated with the successful completion of the W1A write frame on UD1-M1, to UD1-SV. As shown by reference number 714, UD1-SV may receive the W1A UD1-M1 reply frame, and may decrement a reply count, associated with the W1A write frame, by one (e.g., the reply count may be decremented from two to one). As shown by reference number 716, UD1-SV may determine (e.g., based on the W1A reply count being greater than zero) that the W1A UD1-M1 reply frame is not the last reply frame associated with the W1A write frame, and UD1-SV may drop the frame.

Figure 7C:
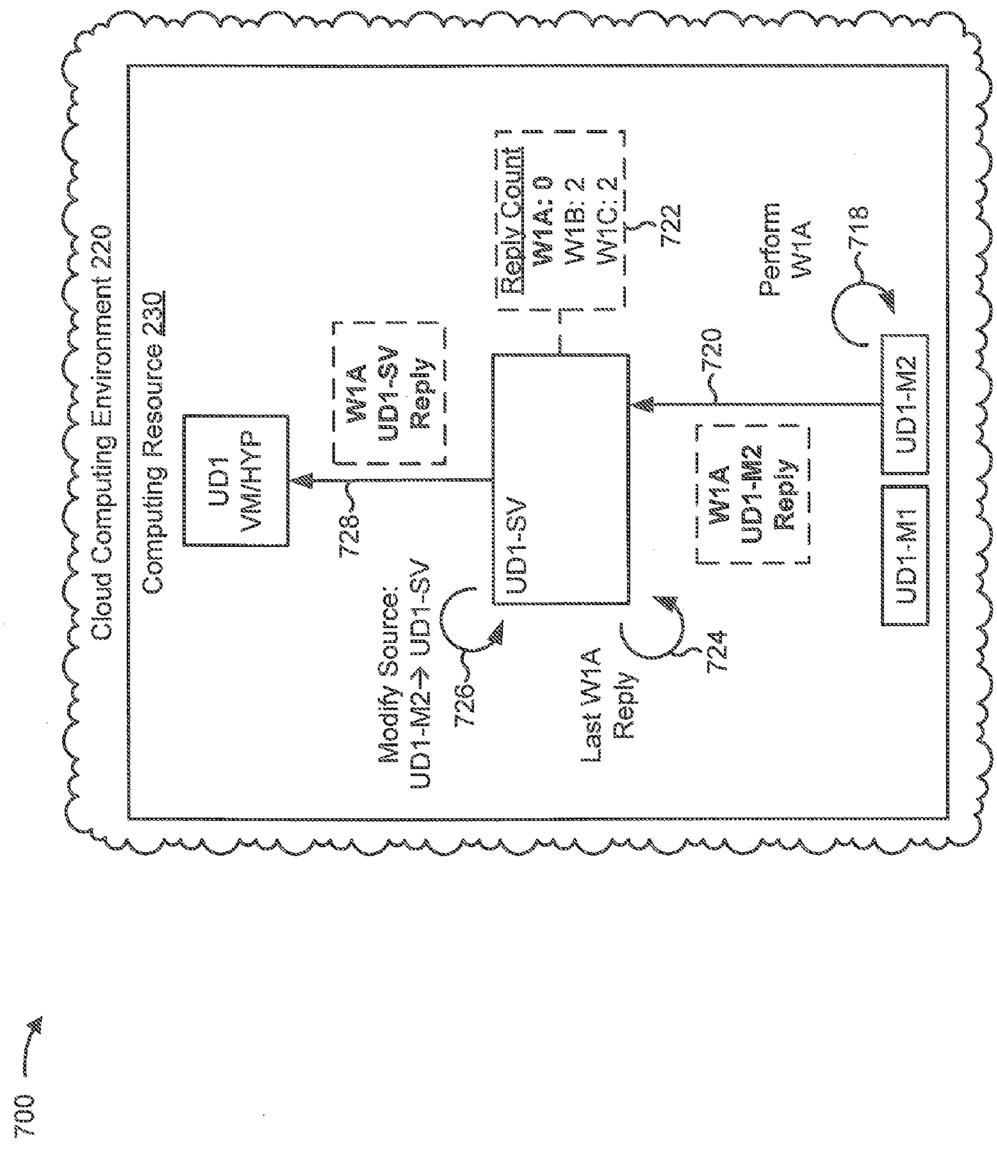

As shown in FIG. 7C, and by reference number 718, UD1-M2 may perform the portion of the write operation included in the W1A write frame (e.g., after receiving the W1A write frame from UD1-SV). As shown by reference number 720, UD1-M2 may provide a reply frame, associated with the successful completion of the W1A write frame on UD1-M2, to UD1-SV. As shown by reference number 722, UD1-SV may receive the W1A UD1-M2 reply frame, and may decrement a reply count, associated with the W1A write frame, by one (e.g., the reply count may be decremented from one to zero). As shown by reference number 724, UD1-SV may determine (e.g., based on the W1A reply count being equal to zero) that the W1A UD1-M2 reply frame is the last reply frame associated with the W1A write frame.

As shown by reference number 726, UD1-SV may modify source information included in the W1A UD1-M2 reply frame to indicate that the source of the reply frame is UD1-SV, rather than UD1-M2 (e.g., since UD1 VM/HYP provided the write frames to UD1-SV, UD1 VM/HYP may be expecting to receive successful reply frames from UD1-SV). As shown by reference number 728, UD1-SV may provide the modified reply frame (e.g., W1A UD1-SV Reply) to UD1-VM/HYP.

Figure 7D:
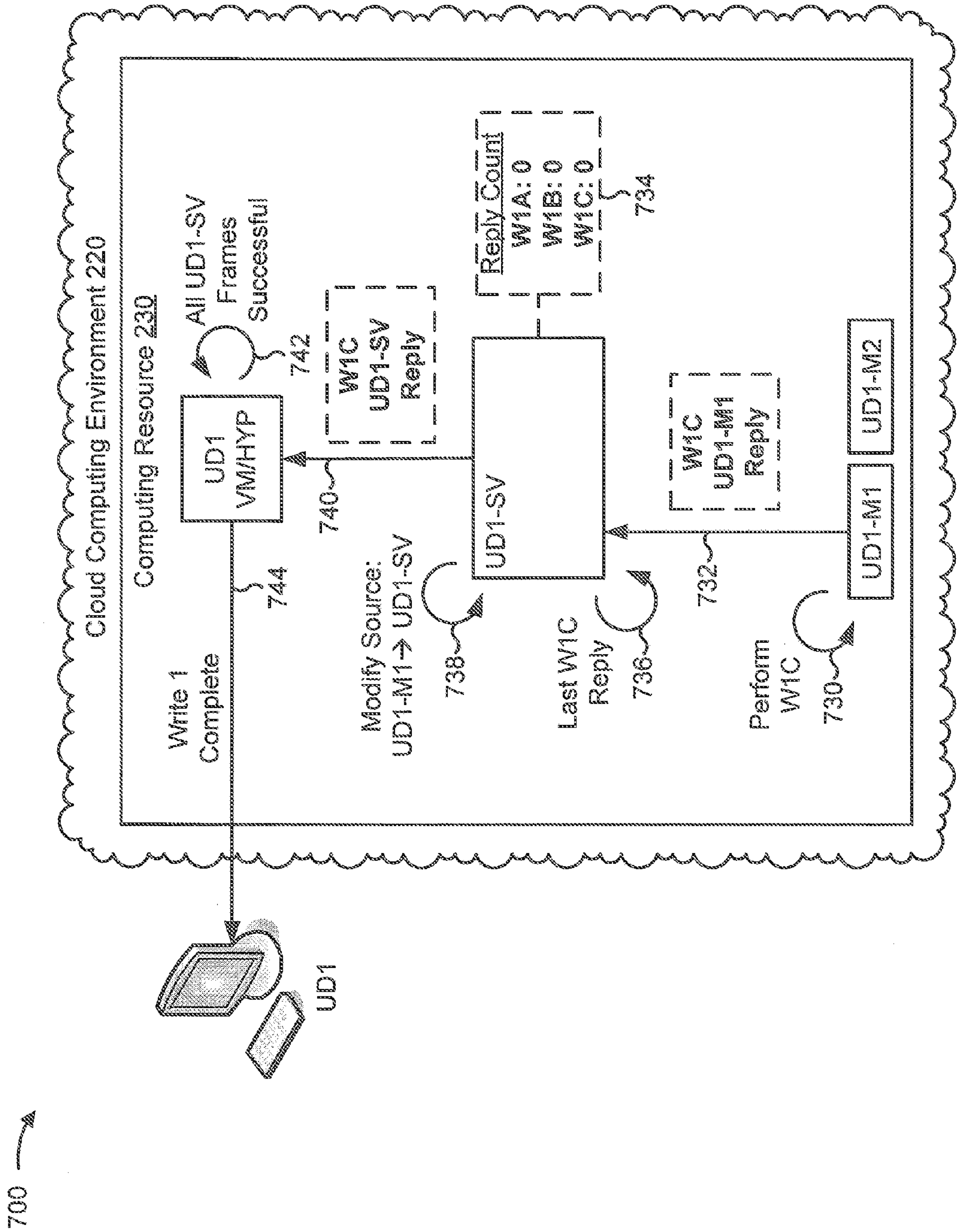

For the purposes of FIG. 7D, assume that UD1 VM/HYP has received, from UD1-SV, a reply frame associated with the W1A write frame and a reply frame associated with the W1B write frame (e.g., UD1-M1 and UD1-M2 have both successfully performed the portion of the write operation included in the W1A write frame and the W1B write frame). Further, assume that UD1-M2 has provided a reply frame associated with the W1C write frame to UD1-SV, and that UD1-SV dropped the W1C UD1-M2 reply frame (e.g., based on a W1C reply count being greater than zero).

As shown by reference number 730, UD1-M1 may perform the portion of the write operation included in the W1C write frame (e.g., after receiving the W1C write frame from UD1-SV). As shown by reference number 732, UD1-M1 may provide a reply frame, associated with the successful completion of the W1C write frame on UD1-M1, to UD1-SV. As shown by reference number 734, UD1-SV may receive the W1C UD1-M1 reply frame, and may decrement a reply count, associated with the W1C write frame, by one (e.g., the reply count may be decremented from one to zero). As shown by reference number 736, UD1-SV may determine (e.g., based on the W1C reply count being equal to zero) that the W1C UD1-M1 reply frame is the last reply frame associated with the W1C write frame (e.g., since UD1-M2 has already provided a reply frame associated with the W1C write frame).

As shown by reference number 738, UD1-SV may modify source information included in the W1C UD1-M1 reply frame to indicate that the source of the reply frame is UD1-SV, rather than UD1-M1. As shown by reference number 740, UD1-SV may provide the modified reply frame (e.g., W1C UD1-SV Reply) to UD1-VM/HYP. As shown by reference number 742, UD1 VM/HYP may determine that each write frame (e.g., the W1A write frame, the W1B write frame, and the W1C write frame) have been successfully performed (e.g., since UD1 VM/HYP has received a reply frame associated with each write frame). As shown by reference number 744, UD1 VM/HYP may provide, to UD1, information indicating that the Write 1 write operation has been successfully completed.

As indicated above, FIGS. 7A-7D are provided merely as an example. Other examples are possible and may differ from what was described with regard to FIGS. 7A-7D.

Implementations described herein may allow a computing resource, associated with a cloud computing environment, to maintain a replication set by transmitting frames of user data, via a data link layer, to one or more storage resources associated with maintaining one or more members of the replication set.

The foregoing description of implementations provides illustration and description, but is not intended to be exhaustive or to limit the implementations to the precise form disclosed. Modifications and variations are possible in light of the above disclosure or may be acquired from practice of the implementations.

It will be apparent that example aspects, as described above, may be implemented in many different forms of software, firmware, and hardware in the implementations shown in the figures. The actual software code or specialized control hardware used to implement these aspects should not be construed as limiting. Thus, the operation and behavior of the aspects were described without reference to the specific software code—it being understood that software and control hardware could be designed to implement the aspects based on the description herein.

As used herein, the term component is intended to be broadly construed as hardware, firmware, or a combination of hardware and software.

To the extent the aforementioned implementations collect, store, or employ personal information provided by individuals, it should be understood that such information shall be used in accordance with all applicable laws concerning protection of personal information. Storage and use of personal information may be in an appropriately secure manner reflective of the type of information, for example, through various encryption and anonymization techniques for particularly sensitive information.

Even though particular combinations of features are recited in the claims and/or disclosed in the specification, these combinations are not intended to limit the disclosure of the possible implementations. In fact, many of these features may be combined in ways not specifically recited in the claims and/or disclosed in the specification. Although each dependent claim listed below may directly depend on only one other claim, the disclosure of the possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Where only one item is intended, the term "one" or similar language is used. Further, the phrase "based on" is intended to mean "based, at least in part, on" unless explicitly stated otherwise.

What is claimed is:

1. A device, comprising:

one or more processors to:

receive information associated with a write operation to be performed on a storage volume included in a cloud computing environment;

divide the information associated with the write operation into a plurality of write frames, each write frame, of the plurality of write frames, including a respective portion of the information associated with the write operation;

determine information that identifies members of a replication set associated with the storage volume;

provide each write frame to each member of the replication set;

receive a first reply frame, associated with a write frame of the plurality of write frames, from a first member of the replication set;

determine that the first reply frame is not a last reply frame associated with the write frame of the plurality of write frames;

drop the first reply frame based on determining that the first reply frame is not the last reply frame associated with the write frame of the plurality of write frames, the first reply frame being dropped such that the first reply frame is deleted by the storage volume, and the first reply frame being dropped to indicate that the write operation, associated with the write frame, is incomplete;

receive a second reply frame, associated with the write frame of the plurality of write frames, from a second member of the replication set, the second member of the replication set being different from the first member of the replication set;

determine that the second reply frame is the last reply frame associated with the write frame of the plurality of write frames;

modify source information, included in the last reply frame, to form a modified reply frame, the modified reply frame identifying the storage volume as a source of the modified reply frame rather than the second member of the replication set as the source of the modified reply frame; and provide the modified reply frame, the modified reply frame being provided to indicate that a portion of the write operation, corresponding to the write frame, has been successfully performed, and the modified reply frame being provided to permit a determination that that write operation has been successfully performed.

2. The device of claim 1, where the one or more processors are further to:

receive information associated with an agreement between a user and a service provider of the cloud computing environment;

store the information associated with agreement; and where the one or more processors, when determining the information that identifies the members of the replication set, are to:

determine the information that identifies the members of the replication set based on the stored information.

3. The device of claim 1, where the one or more processors are further to:

create a first copy of each write frame of the plurality of write frames;

modify the first copy of each write frame to include information that identifies the first member of the replication set;

create a second copy of each write frame of the plurality of write frames;

modify the second copy of each write frame to include information that identifies the second member of the replication set; and where the one or more processors when providing each write frame to each member of the replication set, are to:

provide the modified first copy of each write frame to the first member of the replication set; and provide the modified second copy of each write frame to the second member of the replication set.

4. The device of claim 1, where the one or more processors are further to:

store reply count information associated with each write frame based on providing each write frame to each member of the replication set, the reply count information including a quantity of reply counts equal to a quantity of the plurality of write frames, each reply count being based on a quantity of members of the replication set.

5. The device of claim 1, where the one or more processors, are further to:

decrement a reply count, associated with the write frame, based on receiving the second reply frame associated with the write frame; and where the one or more processors, when determining that the second reply frame is the last reply frame associated with the write frame, are to:

determine that the second reply frame is the last reply frame based on the decremented reply count.

6. The device of claim 1, where the one or more processors are further to:

identify the storage volume as a destination associated with the write operation; and where the one or more processors, when modifying the source information included in the last reply frame to form the modified reply frame that identifies the storage volume as a source of the modified reply frame, are to:

modify the source information to include the information that identifies the storage volume based on identifying the storage volume as the destination associated with the write operation.

7. The device of claim 1, where the one or more processors are further to:

determine that the write operation, associated with the storage volume, has been successfully performed; and provide information that indicates that the write operation has been successfully performed.

8. A non-transitory computer-readable medium storing instructions, the instructions comprising:

one or more instructions that, when executed by one or more processors, cause the one or more processors to:

receive information associated with a write operation to be performed on a storage volume included in a cloud computing environment;

divide the information associated with the write operation into a plurality of write frames, each write frame, of the plurality of write frames, including a respective portion of the information associated with the write operation;

determine information that identifies members of a replication set associated with the storage volume;

provide each write frame to each member of the replication set;

receive a first reply frame, associated with a write frame of the plurality of write frames, from a first member of the replication set;

determine that the first reply frame is not a last reply frame associated with the write frame of the plurality of write frames;

drop the first reply frame based on determining that the first reply frame is not the last reply frame associated with the write frame of the plurality of write frames, the first reply frame being dropped such that the first reply frame is deleted by the storage volume, and the first reply frame being dropped to indicate that the write operation, associated with the write frame, is incomplete;

receive a second reply frame, associated with the write frame of the plurality of write frames, from a second member of the replication set;

determine that the second reply frame is the last reply frame associated with the write frame of the plurality of write frames, the second member of the replication set being different from the first member of the replication set;

modify source information, included in the last reply frame, to form a modified reply frame, the modified reply frame identifying the storage volume as a source of the modified reply frame rather than the second member of the replication set as the source of the modified reply frame; and provide the modified reply frame, the modified reply frame being provided to indicate that a portion of the write operation, corresponding to the write frame, has been successfully performed, and the modified reply frame being provided to permit a determination that that write operation has been successfully performed.

9. The non-transitory computer-readable medium of claim 8, where the one or more instructions, when executed by the one or more processors, further cause the one or more processors to:

receive information associated with an agreement between a user and a service provider of the cloud computing environment;

store the information associated with agreement; and where the one or more instructions, that cause the one or more processors to determine the information that identifies the members of the replication set, cause the one or more processors to:

determine the information that identifies the members of the replication set based on the stored information.

10. The non-transitory computer-readable medium of claim 8, where the one or more instructions, when executed by the one or more processors, further cause the one or more processors to:

create a first copy of each write frame of the plurality of write frames;

modify the first copy of each write frame to include information that identifies the first member of the replication set;

create a second copy of each write frame of the plurality of write frames;

modify the second copy of each write frame to include information that identifies second member of the replication set; and where the one or more instructions, that cause the one or more processors to provide each write frame to each member of the replication set, cause the one or more processors to:

provide the modified first copy of each write frame to the first member of the replication set; and provide the modified second copy of each write frame to the second member of the replication set.

11. The non-transitory computer-readable medium of claim 8, where the one or more instructions, when executed by the one or more processors, further cause the one or more processors to:

store reply count information associated with each write frame based on providing each write frame to each member of the replication set, the reply count information including a quantity of reply counts equal to a quantity of the plurality of write frames, each reply count being based on a quantity of members of the replication set.

12. The non-transitory computer-readable medium of claim 8, where the one or more instructions, when executed by the one or more processors, further cause the one or more processors to:

decrement a reply count, associated with the write frame, based on receiving the second reply frame associated with the write frame; and where the one or more instructions, that cause the one or more processors to determine that the second reply frame is the last reply frame associated with the write frame, cause the one or more processors to:

determine that second the reply frame is the last reply frame based on the decremented reply count.

13. The non-transitory computer-readable medium of claim 8, where the one or more instructions, when executed by the one or more processors, further cause the one or more processors to:

identify the storage volume as a destination associated with the write operation; and where the one or more instructions, that cause the one or more processors to modify the source information included in the last reply frame to form the modified reply frame that identifies the storage volume as a source of the modified reply frame, cause the one or more processors to:

modify the source information to include the information that identifies the storage volume based on identifying the storage volume as the destination associated with the write operation.

14. The non-transitory computer-readable medium of claim 8, where the one or more instructions, when executed by the one or more processors, further cause the one or more processors to:

determine that the write operation, associated with the storage volume, has been successfully performed; and provide information that indicates that the write operation has been successfully performed.

15. A method, comprising:

receiving, by a device, information associated with a write operation to be performed on a storage volume included in a cloud computing environment;

dividing, by the device, the information associated with the write operation into a plurality of write frames, each write frame, of the plurality of write frames, including a respective portion of the information associated with the write operation;

determining, by the device, information that identifies members of a replication set associated with the storage volume;

providing, by the device, each write frame to each member of the replication set;

receiving, by the device, a first reply frame, associated with a write frame of the plurality of write frames, from a first member of the replication set;

determining, by the device, that the first reply frame is not a last reply frame associated with the write frame of the plurality of write frames;

dropping, by the device, the first reply frame based on determining that the first reply frame is not the last reply frame associated with the write frame of the plurality of write frames, the first reply frame being dropped such that the first reply frame is deleted by the storage volume, and the first reply frame being dropped to indicate that the write operation, associated with the write frame, is incomplete;

receiving, by the device, a second reply frame, associated with the write frame of the plurality of write frames, from a second member of the replication set, the second member of the replication set being different from the first member of the replication set;

determining, by the device, that the second reply frame is the last reply frame associated with the write frame of the plurality of write frames;

modifying, by the device, source information, included in the last reply frame, to form a modified reply frame, the modified reply frame identifying the storage volume as a source of the modified reply frame rather than the second member of the replication set as the source of the modified reply frame; and providing, by the device, the modified reply frame, the modified reply frame being provided to indicate that a portion of the write operation, corresponding to the write frame, has been successfully performed, and the modified reply frame being provided to permit a determination that that write operation has been successfully performed.

16. The method of claim 15, further comprising:

receiving information associated with an agreement between a user and a service provider of the cloud computing environment;

storing the information associated with agreement; and where determining the information that identifies the members of the replication set comprises:

determining the information that identifies the members of the replication set based on the stored information.

17. The method of claim 15, further comprising:

creating a first copy of each write frame of the plurality of write frames; modifying the first copy of each write frame to include information that identifies the first member of the replication set;

creating a second copy of each write frame of the plurality of write frames;

modifying the second copy of each write frame to include information that identifies the second member of the replication set; and where providing each write frame to each member of the replication set comprises:

providing the modified first copy of each write frame to the first member of the replication set; and providing the modified second copy of each write frame to the second member of the replication set.

18. The method of claim 15, further comprising:

storing reply count information associated with each write frame based on providing each write frame to each member of the replication set, the reply count information including a quantity of reply counts equal to a quantity of the plurality of write frames, each reply count being based on a quantity of members of the replication set.

19. The method of claim 15, further comprising:

decrementing a reply count, associated with the write frame, based on receiving the second reply frame associated with the write frame; and where determining that the second reply frame is the last reply frame associated with the write frame comprises:

determining that the second reply frame is the last reply frame based on the decremented reply count.

20. The method of claim 15, further comprising:

identifying the storage volume as a destination associated with the write operation; and where modifying the source information included in the last reply frame to form the modified reply frame that identifies the storage volume as a source of the modified reply frame comprises:

modifying the source information to include the information that identifies the storage volume based on identifying the storage volume as the destination associated with the write operation.

* * * * *